United States Patent [19]
Schoon

[11] Patent Number: 5,434,600
[45] Date of Patent: Jul. 18, 1995

[54] ILLUMINATION MODULE FOR BANDWISE IMAGING DEVICE

[75] Inventor: David J. Schoon, Mendota Heights, Minn.

[73] Assignee: Schoonscan, Inc., Mendota Heights, Minn.

[21] Appl. No.: 884,408

[22] Filed: May 18, 1992

Related U.S. Application Data

[63] Continuation-in-part of Ser. No. 827,061, Jan. 28, 1992, abandoned, which is a continuation-in-part of Ser. No. 542,957, Jun. 25, 1990, Pat. No. 5,225,851.

[51] Int. Cl.⁶ .......................... B41J 2/44; B41J 2/47; G02B 26/08
[52] U.S. Cl. .......................... 347/243; 359/234
[58] Field of Search .......................... 346/107 R, 108; 359/227, 234, 235, 67, 45; 358/298

[56] References Cited

U.S. PATENT DOCUMENTS

| | | | |
|---|---|---|---|
| 3,750,539 | 10/1973 | Mason | 358/302 |
| 4,268,871 | 5/1981 | Kawamura | 358/298 |
| 4,389,655 | 6/1983 | Baues | 346/107 R |
| 4,435,064 | 3/1984 | Tsukada et al. | 355/1 |
| 4,739,416 | 4/1988 | Marian | 346/107 RX |
| 4,746,942 | 5/1988 | Moulin | 354/5 |
| 4,761,057 | 8/1988 | Zak et al. | 359/234 |
| 4,867,543 | 9/1989 | Bennion et al. | 350/384 |
| 4,878,066 | 10/1989 | Shiraishi | 346/108 |
| 4,897,672 | 1/1990 | Horiuchi et al. | 346/107 R |
| 4,899,223 | 2/1990 | Springer et al. | 358/302 |
| 4,951,064 | 8/1990 | Kun et al. | 346/107 R |
| 5,054,893 | 10/1991 | Schoon | 359/254 |
| 5,124,829 | 6/1992 | Ishikawa | 346/108 K |

FOREIGN PATENT DOCUMENTS

| | | | |
|---|---|---|---|
| 0189664 | 8/1986 | European Pat. Off. | H04N 1/036 |
| 1128199 | 4/1962 | Germany | 346/107 R |

Primary Examiner—Benjamin R. Fuller
Assistant Examiner—David Yochey
Attorney, Agent, or Firm—Merchant, Gould, Smith, Edell, Welter & Schmidt

[57] ABSTRACT

An electro-optic imager, used for exposing photosensitive media imagewise, wherein an array, e.g. two or more linear arrays, of light sources are imaged onto a rotating drum, to produce images in bands. Apertures are used to shape the beam energies. The use of two or more linear arrays with interlaced imaging allows aperture shapes to be used which precisely control the region of overlapping exposures. With properly shaped apertures, scanning artifacts (e.g. aliasing) can be nearly eliminated.

28 Claims, 10 Drawing Sheets

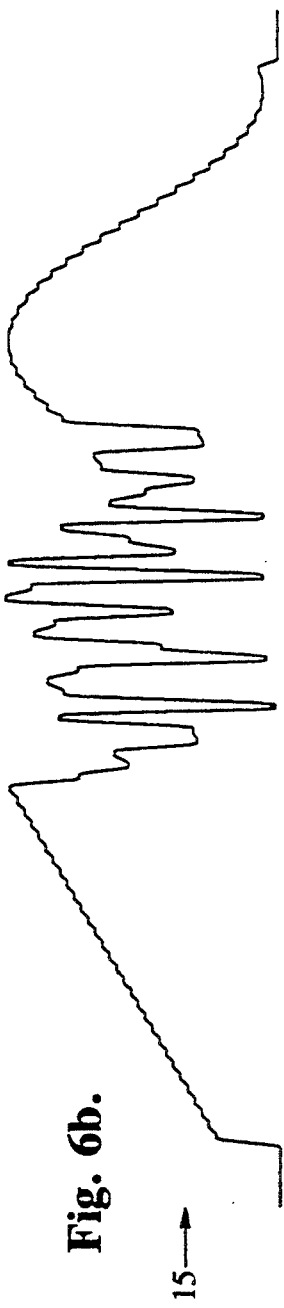

901 150 dpi, Chip A only 911 300 dpi, Chip A
912 300 dpi, Chip B 921 600 dpi, Chip A, Pass #1
922 600 dpi, Chip A, Pass #2
923 600 dpi, Chip B, Pass #1
924 600 dpi, Chip B, Pass #2

931 1200 dpi, Chip A, Pass #1
932 1200 dpi, Chip A, Pass #2
933 1200 dpi, Chip A, Pass #3
934 1200 dpi, Chip A, Pass #4
935 1200 dpi, Chip B, Pass #1
936 1200 dpi, Chip B, Pass #2
937 1200 dpi, Chip B, Pass #3
938 1200 dpi, Chip B, Pass #4

ILLUMINATION MODULE FOR BANDWISE IMAGING DEVICE

REFERENCE TO RELATED APPLICATIONS

This application is a continuation-in-part of my application Ser. No. 07/827,061, filed Jan. 28, 1992 (abandoned), which is a continuation-in-part of my application Ser. No. 07/542,957, filed Jun. 25, 1990, which is now issued as U.S. Pat. No. 5,225,851.

FIELD OF THE INVENTION

Imagers, usually laser imagers, are used to record electronically produced information on photographically sensitive media, e.g. photographic film or paper, or photoconductive drums, as in laser printers. Such devices are used in applications wherein information exists in an electronic form, and a visually observable presentation of the information is desired. Typically a single beam of light is directed sequentially across a photosensitive media, in a raster scan fashion. Typically a laser, e.g. a laser diode, is used to create the beam.

Such imagers are used to create accurate proofs of electronic information, so that when the same information is used to create printing plates and published material, an accurate prediction of the final image appearance may be made. Such imagers are also used to create medical images, wherein the information has been gathered electronically. Creation of second generation originals wherein electronic retouching or other editing of photographic information has been done is another application.

DESCRIPTION OF RELATED TECHNOLOGY

A number of technologies are used to create accurate color hardcopy images. These include laser, ink jet, dye sublimation, and light valve modulation devices.

The laser devices are limited inasmuch as it is difficult to simultaneously obtain rapid speed, high resolution and large image size. Usually a single beam is used. If the beam is directed to the external surface of a spinning drum, the drum speed may need to be very high in order to obtain the necessary speed. Maintaining precision is difficult when the centrifugal forces are high.

If the beam is directed to the internal surface of a stationary drum, a rapidly spinning mirror is used to deflect the beam. At high rotational speeds, centrifugal forces may again make it difficult to maintain precision. Moreover, the larger the image, the larger the diameter of the drum must be, and therefore the longer the optical distance must be from the mirror to the drum. The longer this distance is, the greater the impact of minor errors in the position of the deflecting mirror.

Flat bed scanners are used wherein the photographic media is imaged along a line, typically as the media is pulled through a set of nip rollers at a constant speed. A polygon mirror or galvanometer mirror is used to deflect the beam. An f-theta lens compensates for the varying distance from the mirror to the media. Unfortunately, the various facets of a polygon mirror are not perfect, and thus the imaged lines may not be uniformly separated in spacing. As in the internal drum scanner, for large image sizes the optical distance from the mirror to the media is large, and thus any very slight error in the mirror orientation may cause unacceptable errors in the placement of the scan lines on the media.

Another problem relates to the nature of the light or illumination which is used. One product uses three different laser beams, one each of red, green, and blue light. These three colors match the dye set used on common photographic papers and films. The lasers, particularly the blue lasers, are expensive.

State of the art imagers are often constructed for imaging with a fixed spot size. If the resolution is variable, this is sometimes accomplished by changing the degree of overlap of adjacent pixels. Imagers which vary the size of a laser spot tend to be expensive. An inexpensive imager which allows both variable spot size and variable resolution is not available.

Patents describing technology related to this problem include U.S. Pat. Nos. 5,054,893, issued to Schoon, as well as Moulin, 4,746,942, Bennion, 4,867,543, and Springer, 4,899,223.

SUMMARY OF THE INVENTION

The present invention addresses the problems of producing images at various resolutions, over a wide range in resolutions, wherein at each resolution the pixel size is adjusted so as to be appropriate for that resolution.

Furthermore, the present invention tends to produce images at minimal costs by utilizing inexpensive components.

Another advantage of this invention is to produce images with high accuracy, wherein artifacts are not visible, and grayshades are correct, while having the flexibility to quickly produce either color or black and white images.

In the present invention, a plurality of controllable light sources is imaged onto the surface of a slowly rotating drum. After the drum has turned one or more revolutions, thus creating a band of image, the optical system is translated (moved) so as to allow the creation of subsequent bands of image.

The source of illumination is a lamp, modulated by one or more linear arrays of PLZT light valves. The light emerging from the light valves is controlled by various apertures and filters, these apertures and filters being selected so as to produce various beam colors, sizes, and energy distributions. Various aperture selections are made available on a wheel, which is rotated to the desired position by a stepping motor. Similarly, various color filters are placed on a second wheel, which is rotated to the desired filter selection by a second stepping motor.

It is desired that not only the beam size, but also the beam energy distribution be controlled so as to minimize aliasing (staircasing of sloping edges). It is also desired that each beam should overlap adjacent beams to a controllable extent. To permit this, at least for some of the resolution choices, adjacent PLZT cells are imaged onto non-adjacent scan lines and multiple exposures are made for each band. For example, on one revolution of the drum, the even numbered pixels might be imaged, and on a subsequent revolution of this drum, the odd numbered pixels might be imaged. For the even numbered pixels, cross-scan image position is used. For the odd numbered pixels, another cross-scan image position is used. The resultant, interleaved image is a combination of what is imaged with the two image positions. The two sets of image positions are displaced slightly from each other in a direction parallel to the axis of the array. (This is also the same direction as the axis of the drum.) The adjustment of image position is done by selection among various aperture positions, and/or by movement of an optical component, e.g. a glass plate. In the case where apertures of slightly different positions are used, in order that these apertures do not fall on divisions between cells, and thus crosstalk between pixels occur, a displacement between aperture sets in the perpendicular direction is also used, and the electrode structure is oriented non-orthogonally to the axis of the array.

On the wheel of aperture selections are various patterns which control the beam energy distribution, the total beam energy, the beam size, and the beam spacing. The total beam energy is controlled in view of the smallest apertures which are to be used, so that approximately the same drum speed may be used for all available resolutions.

In order to provide for high beam intensity accuracy, an optical system may be used which projects an image of the PLZT chips onto the array of apertures. This optical system permits the insertion of a beam splitter which projects a portion of the light emerging from the PLZT chips onto an array of photodiodes. These photodiodes are used in a feedback circuit to partially control the voltage to the PLZT chip electrodes.

BRIEF DESCRIPTION OF THE DRAWINGS

FIG. 6a shows another set of apertures (trapezoids), according to either preferred embodiment. FIG. 6b shows the resulting integrated exposure at the drum.

DETAILED DESCRIPTION OF THE FIRST PREFERRED EMBODIMENT

In a first preferred embodiment, an image is created on photographic media which is attached to the external surface of a slowly rotating drum. Bands of image are created, each approximately 0.2" wide. When one band is completed, a portion of the optical system moves and an adjacent band is created. This is continued until the entire photographic media (18"×24" for example) is imaged.

Figure 1:
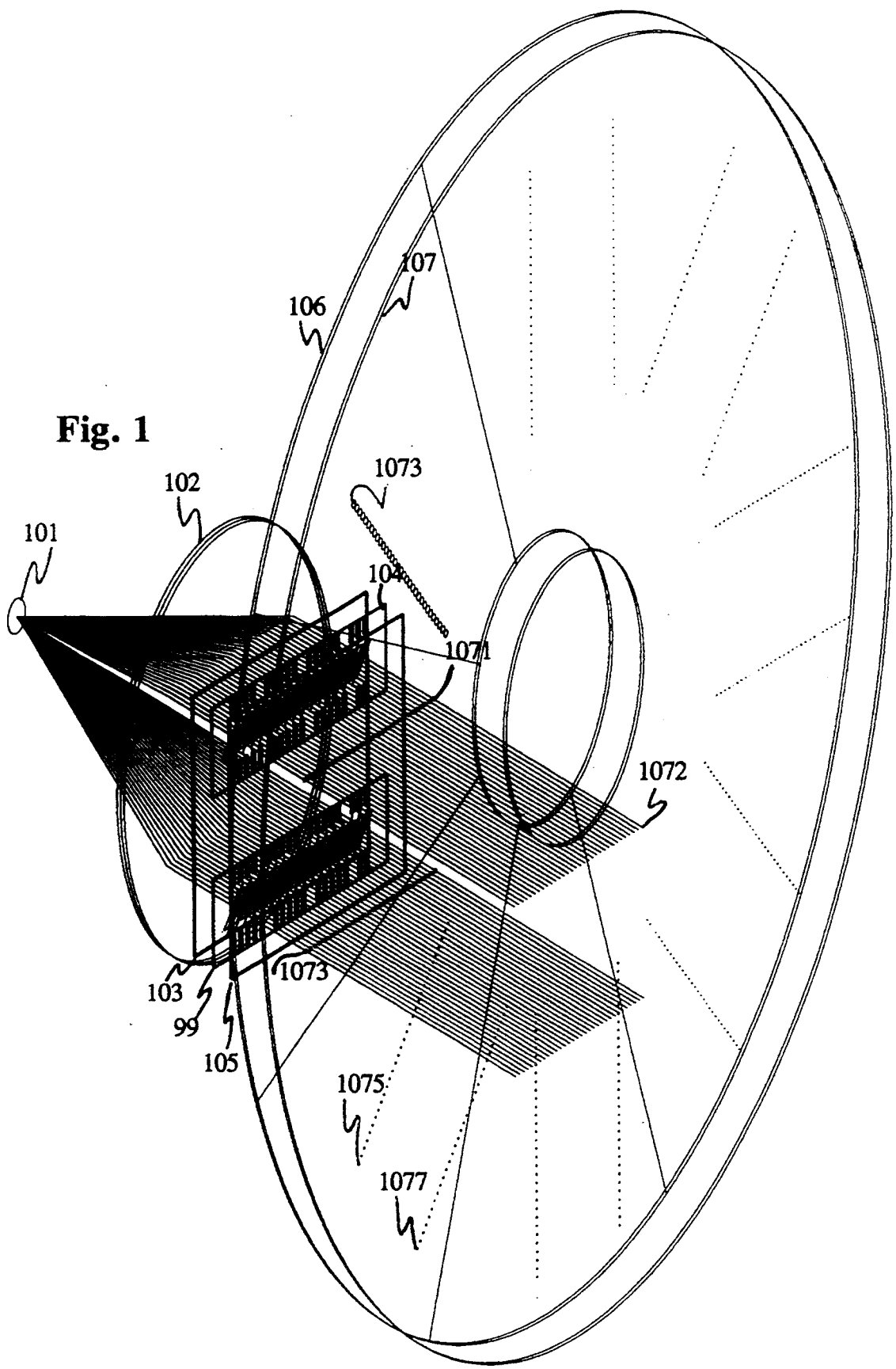
FIG. 1 shows an overall view of the illumination module for a bandwise drum scanner according to a first preferred embodiment.
Figure 2:
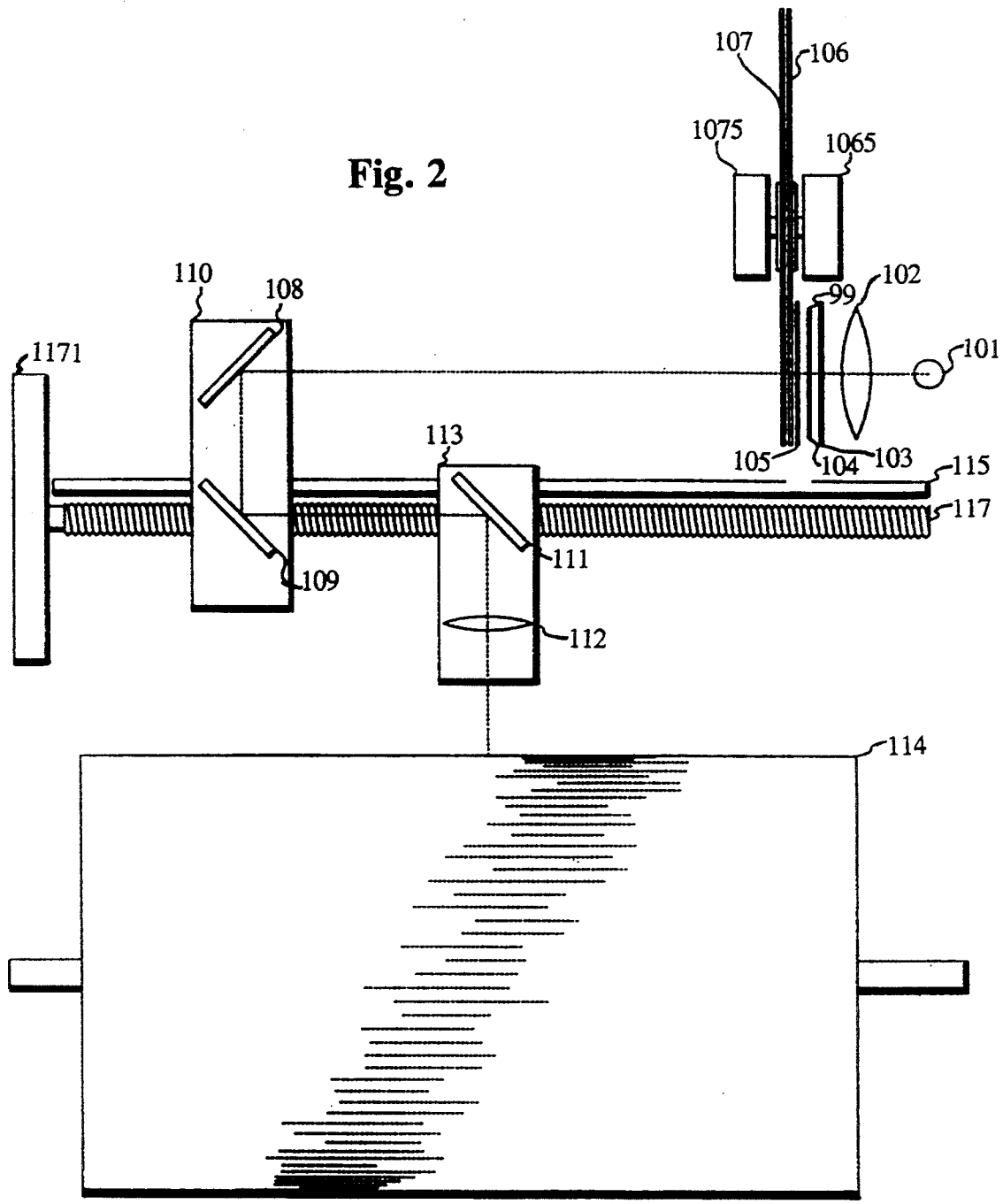
FIG. 2 shows a rotating drum and imaging system which conveys the image to this drum, according to a first preferred embodiment.

The illumination portion of the imager is illustrated in FIG. 1. The overall environment which utilizes this illumination portion is illustrated in FIG. 2. Unless otherwise indicated, the following refers to FIG. 1, but the same components may also be identified in FIG. 2.

Figure 4:
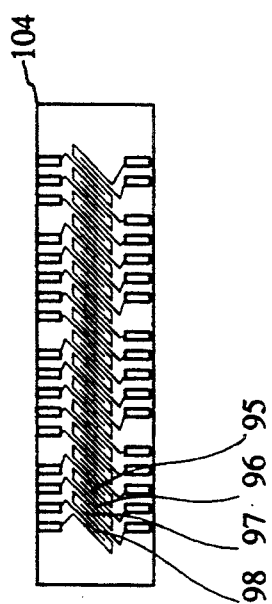
FIG. 4 shows the electrode pattern for the PLZT chip, according to either preferred embodiment.

The illumination source is a lamp, 101. A quartz halogen lamp is used, but alternatively a short arc xenon lamp may also be used. The light from the lamp is collimated, or focused onto an objective lens (112, in FIG. 2) by lens 102. Alternatively, a reflector behind the lamp (not shown) may also be used. This light is polarized by polarizer 103. The axis of polarization may be rotated, depending on the electrode potentials, within piezoelectric optical linear array or PLZT chips 104 and 99. The actions of these devices are explained in greater detail for example in my U.S. Pat. No. 5,054,893. In general, and as can be seen in FIG. 4, there are 32 cells in each PLZT chip 104, each of which is individually controllable. A second polarizer, 105, allows more or less light to pass depending on the angle of polarization. Thus, depending on the electric potential within electro optic linear arrays 104 and 99, the polarization of light reaching polarizer 105 will be rotated or not rotated so as to allow or not allow light to pass through second polarizer 105. The combination of polarizer 103, PLZT chips 104 and 99, and second polarizer (sometimes called an analyzer) 105, forms a linear array of light valves. The light passing through can be controlled over a 200:1 or greater contrast ratio, and with maximum speeds of at least 100 Khz to 1 Mhz.

The color of the light which is imaged is selected and changed via a filter wheel 106. A stepping motor (1065, in FIG. 2) rotates this wheel so as to select a red, blue, or green filter. A clear filter or an opaque area are also selectable. All items in FIG. 1 are illustrated as transparent for purposes of clarity, even though (as in the case of the filter wheel) some parts are primarily opaque.

The size and shape of each of the two sets of 32 beams is determined by aperture wheel 107. A second stepping motor (1075, in FIG. 2) rotates this wheel to select apertures for one of the following:

150 dpi imaging (using just one of the two PLZT chips)
300 dpi imaging
600 dpi imaging, 1st pass
600 dpi imaging, 2nd pass
1200 dpi imaging, 1st pass
1200 dpi imaging, 2nd pass
1200 dpi imaging, 3rd pass
1200 dpi imaging, 4th pass The aperture wheel is mostly opaque, while the apertures are clear. It may be a piece of photographic film which has been exposed and processed, or it may be a thin piece of copper which has been etched. Detents (not shown) around the circumference of this wheel assure that exactly accurate and reproducible positions for the apertures are achieved. The rotational accuracy of the stepping motor may not be sufficiently accurate to achieve the same aperture positions with repeated operations.

Figure 7:
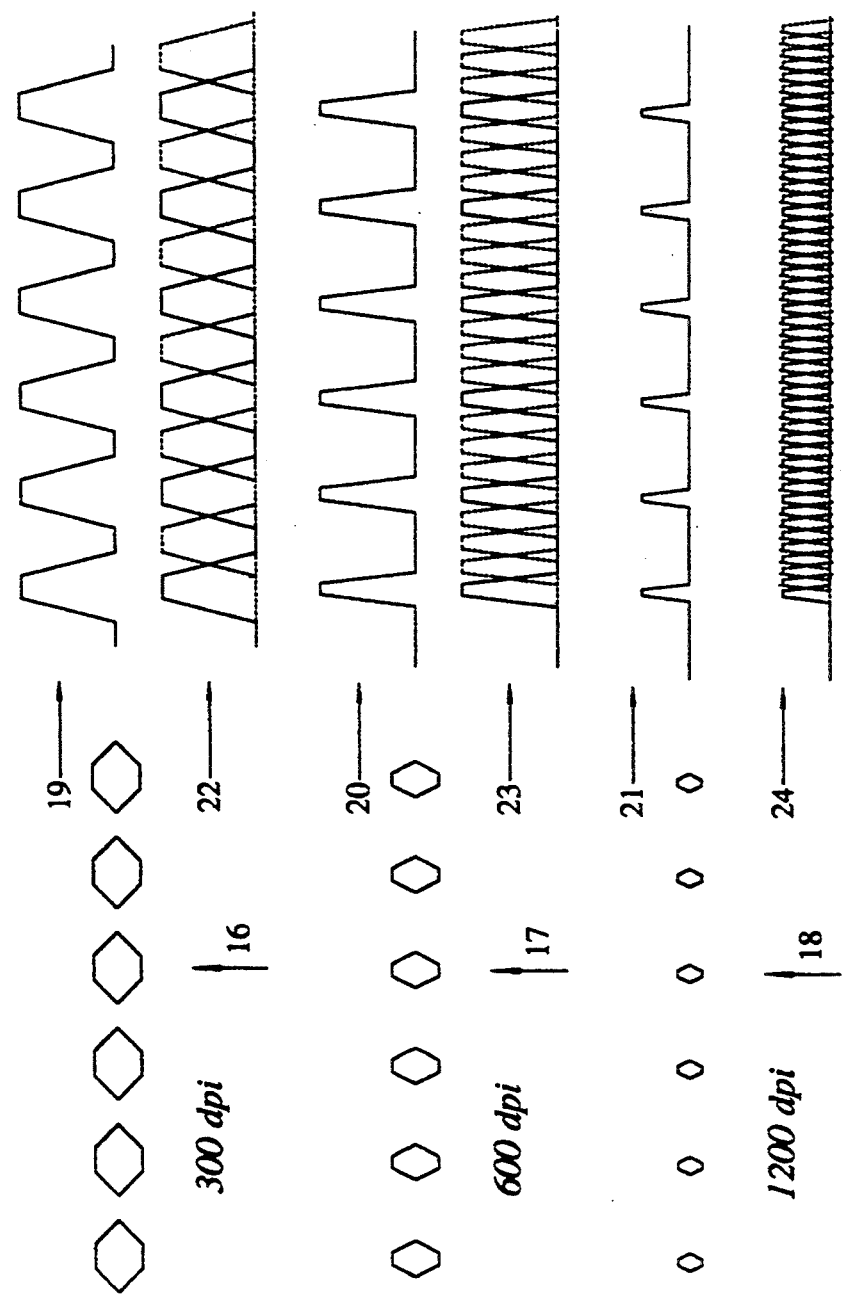
FIG. 7 shows apertures for 300, 600, and 1200 dpi, with resulting integrated exposures, according to either preferred embodiment.

One of the apertures is indicated in FIG. 1 by reference 1071. Actually, each aperture 1073, for example, is a series of discrete perforations, as best seen in FIGS. 5–7, as will be discussed in more detail. One of the beams of light passing through these apertures is indicated by reference 1072. This beam would converge in the region of objective lens 112 (see FIG. 2).

FIG. 2 shows the remainder of the optical system. Optical assemblies 110 and 113 slide on smooth shaft 115. Assembly 110 contains two mirrors, 108 and 109. Assembly 113 contains one mirror, 111, and objective lens 112. Assembly 113 is moved by leadscrew 117, which is rotated by stepping motor 1171. Assembly 110 is moved by a wire rope system (not shown), connected to assembly 113, but with a mechanical advantage such that it moves in the same direction, but half as much, as assembly 110 moves. In this way the total optical path length from aperture wheel 107 to objective lens 112 always stays the same.

An alternate, more complex, mechanical system is disclosed in my copending application Ser. No. 07/542,957. The same objective is achieved as is disclosed herein, but with somewhat higher reproducibility.

Lens 112 forms an image of the apertures 1071, 1073, 075, 1077, etc. on drum 114. Drum 114 is made to slowly rotate by a motor and drive train (not shown). For example, if the resolution is 300 dpi, and the maximum size image to be created is 24" long, a 27" circumference (8.6" diameter) drum could be used, having 8100 pixels per revolution. If the rate of data update to the PLZT chip (all 32 cells) is once every 16 microseconds, which is feasible with such devices, then the rate of revolution is one turn every 0.13 (16 microseconds/pixel × 8100 pixels =) seconds, or approximately 463 RPM. At this speed, centrifugal forces are of minimal or no importance. The overall data rate is about 32 bytes per 16 microseconds, or 2 MB/second. This is as fast or faster than most devices constructed with previous methods.

The spacing between cells of the PLZT chip is typically 0.030". The spacing between the image of each cell, on the drum, is typically 1/150". The magnification ratio is typically 4.5:1.

When imaging is done at 150 dpi, a single PLZT chip is used; the other chip is not used. Thirty of the 32 cells are used. For one revolution of the drum a red filter and red data are used. For the next revolution, a green image is superimposed over the red image, and finally for a third revolution a blue image is created. Then the PLZT chips are set for minimum light passage and the optical system is translated (moved) by 0.2" (30 pixels at 150 dpi). When this is done, the process is repeated. Control electronics (not shown) makes certain that the various images are placed in register with each other.

When imaging is done at 300 dpi, both PLZT chips 99 and 104 are used. One images the even numbered scan lines and the other images the odd numbered lines. The two sets of images are interlaced. The data to one of the chips is delayed to compensate for its different vertical position. Except for the fact that two chips are used, the process is similar to the 150 dpi sequence. Each band is 0.2" (60 pixels at 300 dpi) wide.

When imaging is done at 600 dpi, both PLZT chips 99 and 104 are used, and two revolutions of the drum 114 are used for each color. A different pair of apertures 1071 and 1073, 1075 and 1077, etc. are used on the first and second revolutions. The apertures are displaced from each other in both the horizontal and vertical directions. The horizontal displacement allows different scan lines to be accessed. The vertical displacement allows each aperture to stay within the image of a single, correct cell. FIG. 4 shows the electrode pattern of the PLZT chip 104. The cells 98, 97, 96, 95, etc. are configured with boundaries non-orthogonal to the axis of the array for a variety of reasons, one of which is to allow each cell to image over a range which slightly overlaps that of adjacent cells. If various apertures are used, the data is delayed to compensate for the various vertical positions.

For imaging at 600 dpi, if the scan lines are numbered sequentially, they are imaged as follows:

| | | |
|---|---|---|
| 1st PLZT chip | 1st revolution | lines 1,5,9 etc. |
| 2nd PLZT chip | 1st revolution | lines 3,7,11, etc. |
| 1st PLZT chip | 2nd revolution | lines 2,6,10, etc. |
| 2nd PLZT chip | 2nd revolution | lines 4,8,12, etc. |

A total of 6 revolutions are required to create the band of image in all three colors. When the band is completed, the optical system is translated by 0.2" (120 pixels, 600 dpi).

When imaging is done at 1200 dpi, four revolution of the drum are used for each color. Four different apertures are used. Imaging is done as follows:

| | | |
|---|---|---|
| 1st PLZT chip | 1st revolution | lines 1,9,17, etc. |
| 2nd PLZT chip | 1st revolution | lines 5,13,21, etc. |
| 1st PLZT chip | 2nd revolution | lines 2,10,18, etc. |
| 2nd PLZT chip | 2nd revolution | lines 6,14,22, etc. |
| 1st PLZT chip | 3rd revolution | lines 3,11,19, etc. |
| 2nd PLZT chip | 3rd revolution | lines 7,15,23, etc. |
| 1st PLZT chip | 4th revolution | lines 4,12,20, etc. |
| 2nd PLZT chip | 4th revolution | lines 8,16,24, etc. |

When the band is completed, the objective lens 112 is moved by 0.2" (240 pixels, 1200 dpi).

The interlacing of the scan lines is indicated in greater detail in FIGS. 9a, 9b, 9c, and 9d, for 150, 300, 600, and 1200 dpi resolutions, respectively.

DETAILED DESCRIPTION OF THE SECOND PREFERRED EMBODIMENT

Figure 3:
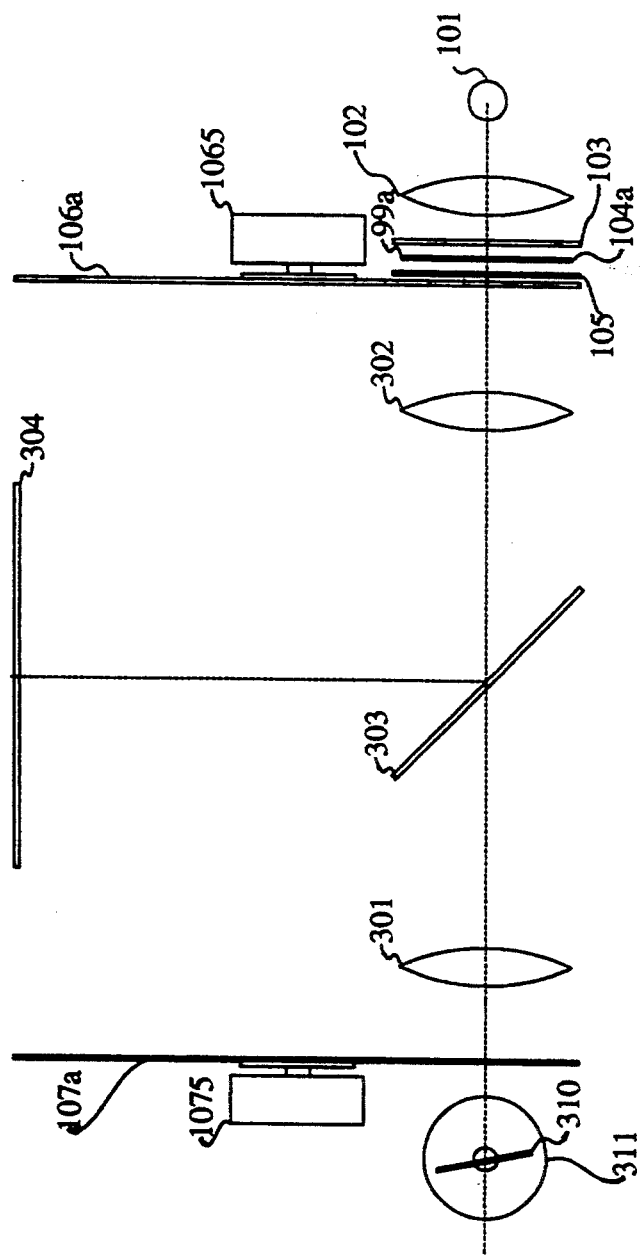
FIG. 3 shows a modified illumination module with a provision for electronic feedback, according to a second preferred embodiment.

Ideally, the light flux through each aperture should be controlled very precisely. Factors which make this difficult include the following: (1) the lamp may vary in its intensity; (2) the PLZT chips have a small amount of hysteresis; and (3) the PLZT chips are somewhat temperature sensitive. In order to compensate for these variations, it is desired that a feedback system be included to monitor the light flux through each PLZT cell, and adjust the voltage to each cell to compensate for variables which may cause errors. FIG. 3 shows a modification of the illumination module wherein the filter wheel 106a and aperture wheel 107a have been moved apart to allow an image of the PLZT chips to be formed on printed circuit board 304. This printed circuit board contains two rows of 32 photodiodes each. A beam splitting mirror 303 allows about 50% of the light to be diverted to this board, while most of the remaining 50% is delivered to the aperture wheel. Lenses 302 and 301 are part of an optical system constructed so that an image of lamp 101 is formed on objective lens 112. This is required for optimal overall efficiency. An image of PLZT cell 104a is formed on printed circuit board 304. Specifically, each PLZT cell 104a, 99a is imaged onto a single photodiode on this board. An image of PLZT cells 104a and 99a is also formed on aperture wheel 107a. Finally, an image of the aperture wheel 107a is formed, by lens 112, on the drum 114.

The optical path following aperture wheel 107a is identical to that shown as following aperture wheel 107 in FIG. 2.

Four optical relationships must be simultaneously satisfied:

(1) PLZT chips 99a and 104a must form an image at least approximately in focus, and at the correct magnification ratio, on printed circuit board 304.

(2) PLZT chips 99a and 104a must form an image at least approximately in focus, and at the correct magnification ratio, on apertures 107a.

(3) Apertures 107a must form an image in focus and at the correct magnification ratio on drum 114.

(4) Lamp 101 must form the smallest possible image (of the lamp filament) on objective lens 112. (This criteria forms the brightest possible image, so that the overall optical efficiency is high.)

Those skilled in the art will recognize that these four conditions may be satisfied in a wide variety of ways, including the following:

1. PLZT chip cell to cell distance, along axis of array, =0.030"
2. Photodiode to Photodiode distance, along axis of array, on printed circuit board 304, =0.20"
3. Focal length, condensing lens 102, =38 mm
4. Focal length, lens 302, =63 mm
5. Focal length, lens 301, =63 mm
6. Focal length, lens 112, =75 mm
7. Optical path distance, lamp 101 to condensing lens 102 32 1.670"
8. Optical path distance, lens 102 to PLZT chips 99a, 104a, =0.984"
9. Optical path distance, PLZT chips 991, 104a, to lens 302, =2.852"
10. Optical path distance, lens 302 (reflecting off beam splitter 303) to pc board 304, =19.016"
11. Optical path distance, lens 302 (passing through beamsplitter 303) to lens 301, =4.961"
12. Optical path distance, lens 301, to aperture wheel 107a, =2.108"
13. Optical path distance, aperture wheel 107a (reflecting off lenses 108, 109, and 113) to lens 112, =16.239"
14. Optical path distance, lens 112 to drum 114, =3.609"

The magnification ratio between the PLZT cells and the apertures 107a is very nearly 1.000. The images on the drum are 4.5× smaller than the apertures. The images on PC board 304 are 6.667× larger than the PLZT cells.

The drive circuits (not shown) which control the PLZT chips 99a and 104a are operated in a feedback loop which includes the output of each of the photodiodes (not shown) on printed circuit board 304. In this way, the consequences of various errors are eliminated.

Figure 8A:
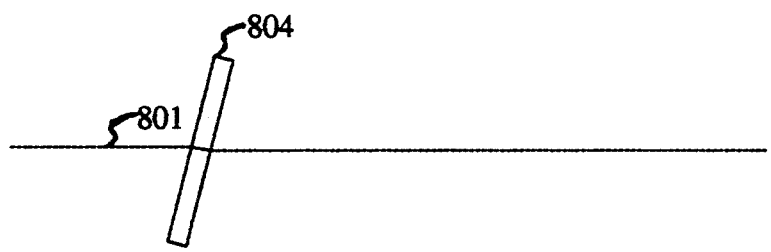
FIG. 8 shows the action of a rotatable glass plate for micro adjustment of image position, according to the second preferred embodiment.
Figure 8B:
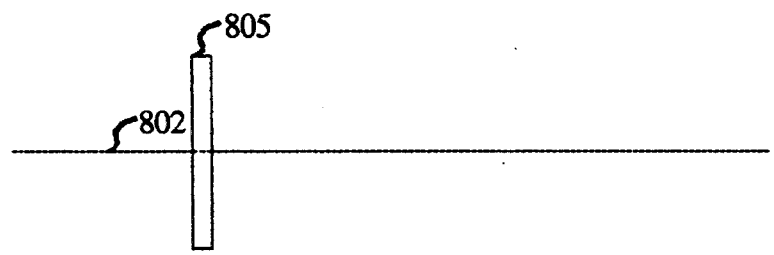
Figure 8C:
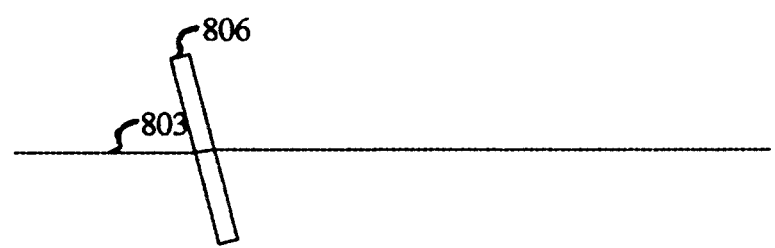
Figure 9A:
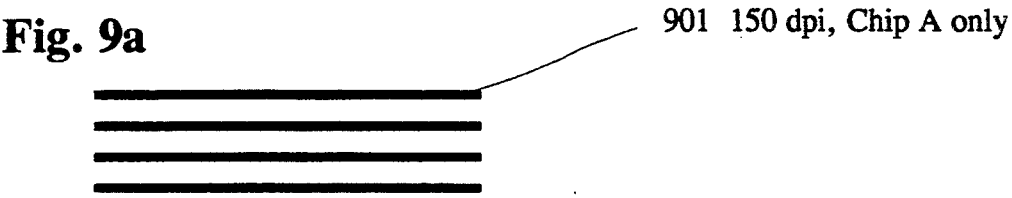
FIGS. 9a, 9b, 9c, and 9d show the interleaving of data at 150, 300, 600, and 1200 dpi resolutions, respectively. These figures are applicable to either preferred embodiment.
Figure 9B:
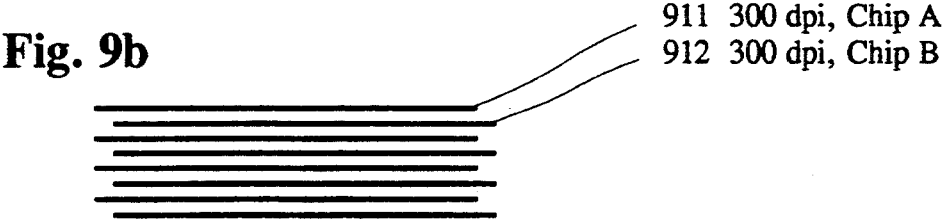
Figure 9C:
Figure 9D:
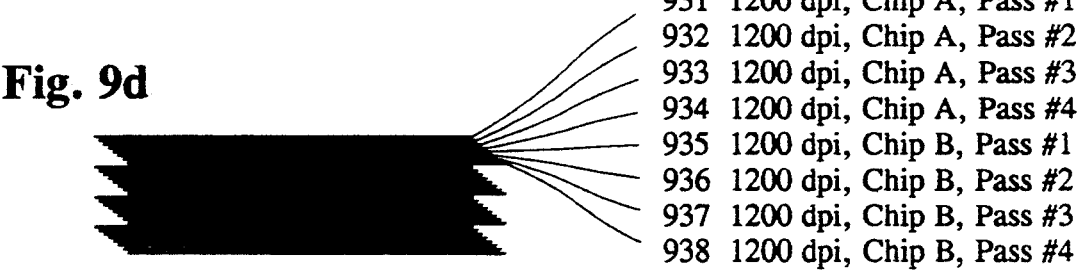

In the first preferred embodiment it was disclosed that the cross-scan position of the apertures was changed for 600 and 1200 dpi imaging by choosing different aperture patterns on filter wheel 107. Such a method may also be used with the second preferred embodiment, or a second method may also be used. In this second method, a thin glass plate, 310, is slightly rotated by stepping motor and gear train 311, in FIG. 3. Because of the refraction of light within the glass plate, a slight adjustment of the apparent image position is made as this plate is rotated. Because the amount of such image movement is small, even with significant rotation of the glass plate, adjustment of the cross-axis image position to within a very small fraction of the separation distance between scan lines is possible. The refraction of light within this glass plate is shown in greater detail in FIGS. 8a, 8b, and 8c. Light passing through the plate, indicated by rays 801, 802, and 803, is moved depending on the position of the glass plate, indicated by 804, 805, and 806 in various positions. The amount of movement is dependent on the thickness of the glass plate and the index of refraction of the glass. For example, for a 1.5 mm thick glass plate of index of refraction 1.523, as is commonly available (Edmund Scientific Co.), the image is moved by 0.180 pixels (at 1200 dpi) for every one degree of rotation of the plate.

Multiple positions of the glass plate are used to achieve the interlacing of scan lines at 600 and 1200 dpi resolutions.

Still according to this preferred embodiment, imaging at 600 dpi is accomplished by a first rotation of the imaging drum, 114, wherein one line of apertures images scan lines 1, 5, 9, . . . , etc. The second line of apertures images scan lines 3, 7, 11, . . . , etc. These lines of image are produced at a first extent of tilting or rotation of the glass plate. Then, for a subsequent rotation of the imaging drum, a relative rotation angle of t degrees is used, and scan lines 2, 6, 10, . . . are imaged by the first line of apertures, and scan lines 4, 8, 12, . . . are produced by the second line of apertures.

The value of t in the above example is easily calculated. In the preferred embodiment, the reduction ratio is 4.5:1, and the apertures in a single line apply to every 4th pixel, so the spacing between apertures is 4.5*4*(1/600")=0.030". An apparent image movement of one pixel would be over a distance of 4.5*1*(1/600")=0.0075". At a rate of 0.00068" per degree of rotation, the required rotation angle, t, is 0.0075"/0.00068"/deg=11.03 degrees. Preferably, for the first rotation of the drum, the imaginary normal vector from the surface of the glass plate is inclined $-\frac{1}{2}$ of 11.03 degrees, or −5.515 degrees, and for the second rotation an inclination of +5.515 degrees is used.

As a further extension of this preferred embodiment, the rotation of the glass plate is made to reflect not only the interleaving of scan lines of image, but also known errors which might, exist in image placement. A method of placing image sections at highly reproducible albeit not necessarily inexact locations, is detailed in my copending application, AAA,AAA.

As an alternative to the use of a tiltable glass plate, a piezo positioning device could be used to adjust the position of the apertures, or of a mirror or mirrors, or of the objective lens. The use of the glass plate is preferable inasmuch as exact control of the angle of rotation of the plate is not required in order to obtain highly precise control on the placement of the image.

The advantage of using a rotatable glass plate instead of different apertures is that less precision in the aperture wheel is required for a given line to line precision in the scan lines. Still another advantage of the rotatable glass plate method is that minor errors in band positioning can be compensated for by additional adjustment of the angle of rotation of the glass plate. Still another advantage of the glass plate method is that various other resolutions, e.g. 1800 and 2400 dpi, can be achieved by smaller increments of motion of the glass plate between revolutions. Such addressabilities might be accompanied by smaller aperture sizes as well, but such matching aperture sizes are not absolutely necessary.

The disadvantage of the rotatable glass plate method is that there is an additional cost for the additional stepping motor, glass plate, and control electronics.

Additional Description Applicable to Either Preferred Embodiment

Figure 5A:
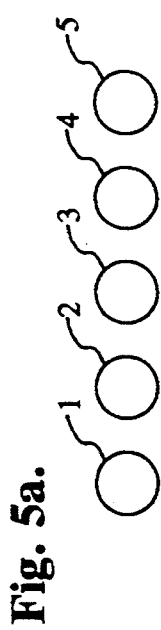
FIG. 5a shows one set of apertures (circles), according to either preferred embodiment.
Figure 5B:
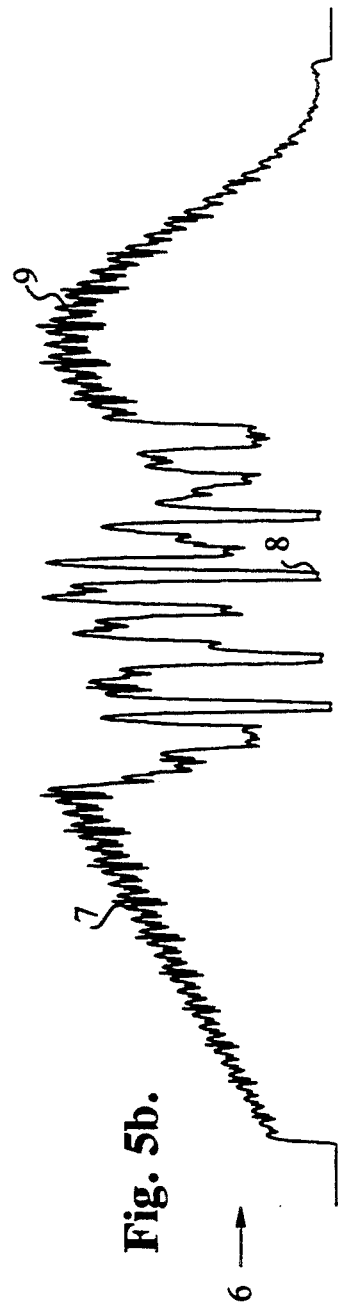
FIG. 5b shows the resulting integrated exposure at the drum.

It is desired that the resultant image not contain visible scan lines, aliasing (staircased edges), or other artifacts which sometimes distinguish scanned images from those produced purely optically. In the prior art, the most common beam energy profile shape is that of a Gaussian curve. Some overlap between beams is provided for, and scanning artifacts are undesirably visible if the photographic media is of high quality (e.g. an ultra-fine grain film). The aperture shape which would most closely approach prior art practice would be a circular aperture. FIG. 5a shows a row of circles 1, 2, 3, 4, 5 which would represent a row of such apertures. In FIG. 5b, the calculated integrated exposure 6 for a certain test pattern is illustrated, wherein the aperture shape is that of the circles 1-5 in FIG. 5a. The first third 7 of the test pattern, used to create FIG. 5b, is a linear slope. The second third 8 is a series of random grayshades, changing with each pixel. The final third 9 is a section of a sine wave. The size of the circles is selected for minimum generation of artifacts. 300 dpi scanning is used, wherein the circles 1-5 illustrated in FIG. 5a are used for the even numbered scan lines, and the curve of FIG. 5b shows the combined even and odd exposures. It can be seen in FIG. 5b that if the media is capable of resolving them, objectionable artifacts are present.

In FIG. 6a, the preferred polygonal aperture shape according to the present invention is illustrated. Again, these apertures 10, 11, 12, 13, 14 are for even numbered pixels at 300 dpi, wherein a similar set of apertures (not shown) would be used for the odd numbered pixels. FIG. 6b shows the resultant exposure 15 for the same test pattern used to create FIG. 5b. Most of the undesired artifacts have disappeared, and the ability to resolve fine detail has improved. It should be noted that the aperture shape which is used is designed with careful consideration of a region of overlap between pixels. Within this region of overlap between pixels, as the point of interest moves parallel to the axis of the array of apertures, the decrease in flux from one aperture exactly matches the increase in flux in the next aperture. More specifically, if the distance between pixels is used as a reference, and the nominal boundaries of a pixel are ±0.5 pixel, then the aperture is shaped as follows:

The region from −0.25 pixel to +0.25 pixel is of uniform height;
The region from +0.25 pixel to +0.75 pixel has a uniform decrease to zero height at +0.75 pixel;
The region from −0.25 pixel to −0.75 pixel is the same.

By using this aperture shape, the summed energy from adjacent pixels, if they all are operated at the same light flux, is uniform.

It is desired that the total light flux for various resolutions not vary over too wide a range. For example, if circular apertures were used, the integrated exposure at 150 dpi would be twice that of 300 dpi exposure, or 8× that of 1200 dpi exposure. It is desired that the same media be usable at any of the available resolutions. To compensate for this variability, either the drum would have to turn at variable speeds, or neutral density filters would be needed.

By controlling the height of the apertures, the range in light intensities is confined to a 2:1 ratio. At 1200 dpi, the drum is rotated at half the rate used for the other resolutions. The various aperture shapes 16, 17 and 18 for 300, 600, and 1200 dpi respectively are shown in FIG. 7. Also shown in each case are graphs 19, 20 and 21, respectively, of the exposures resulting from the indicated apertures. Also shown in the next lower graphs 22, 23 and 24, respectively, are the combined exposures, when all of the apertures and all of the revolutions are considered. It can be seen that the sum of the various curves would produce (as is desired) a constant value, or a straight line graph.

In the case of 150 dpi, a thin slit is used, rather than a series of apertures. For this case, the inherent sloping edges of the pixel boundaries tends to reduce the effects of aliasing, as is described in my U.S. Pat. No. 5,054,893.

It should be noted that if only a single PLZT chip were used, regulating the flux in the region of overlapping pixels would not be easily done. The interlacing of the images allows greater control over the beam energies.

It should also be noted that it is desired that the images be produced as quickly as possible. No imaging occurs while the optical system is translating, and thus it is desired that this time be minimized. In the case of the 300 dpi images, the drum is rotated through three revolutions before the optical system must be moved. For 600 dpi images, there are 6 such revolutions, and for 1200 dpi images, there are 12 such revolutions per band. This arrangement is more efficient than one wherein no interlacing of scan lines was involved, and hence more frequent movement of the optical system would be required.

In still another extension of either preferred embodiment, the pattern of apertures reflects any barrel or pincushion distortion present in the objective lens system. During the time of design of the imager, an image is made using exactly straight rows of apertures, preferably with the drum being stationary at the time. Precise measurements are made of the resultant image, with special attention being given to the straightness of the lines of image. A new set of apertures are made wherein the positions of each of the apertures is made to deviate from its earlier straight line position by an amount which is proportional to (and opposite in sign) to the deviation of the resultant image from a straight line. For example, if a certain aperture is imaged 1% outside the ideal rectangular boundary of images, the new aperture wheel would place that aperture 1% inside the ideal rectangular boundary.

Figure 10:
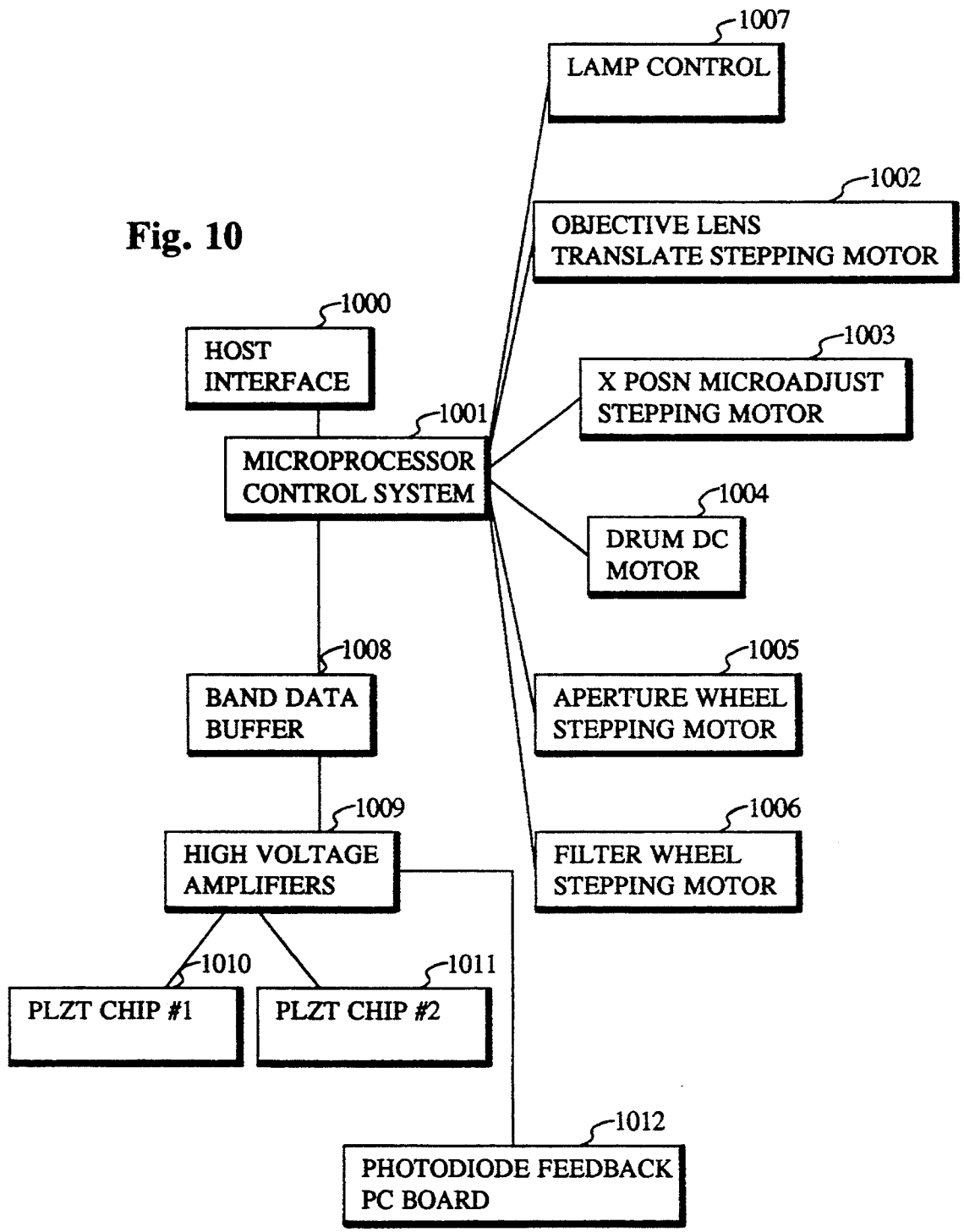
FIG. 10 shows a control system for obtaining precise registration of images, according to the second preferred embodiment.

FIG. 10 illustrates in general terms a control system which could be used with the second preferred embodiment for system control. A microprocessor control system, 1001, provides control for the following:

Lamp 101 (FIG. 2,3), controlled by circuit 1007;
Stepping motor 1171 (FIG. 2), which controls the position of mirror assembly 110 and objective lens assembly 113, controlled by circuit 1002;
Stepping motor 311 (FIG. 3), which controls the position of glass plate 310, controlled by circuit 1003;
A d.c. motor which rotates drum 114 (FIG. 2), this controlled by circuit 1004;
Aperture wheel 107 (FIG. 2) or 107a (FIG. 3), this controlled by circuit 1005;
Filter wheel 106 (FIG. 2) or 106a (FIG. 3), this controlled by circuit 1006.

The microprocessor control system contains programming which is designed according to principles well known to those skilled in the art.

A host interface circuit, 1000, presents image data to the microprocessor control system 1001, which in turn presents data to band data buffer 1008. A second path, not shown, from host interface 1000 directly to band data buffer 1008, performs block data transfers once various setup information is known and communicated to the band data buffer. The band data buffer, 1008, contains data sufficient to image at least one revolution of the drum for a given band, but ideally all scan lines appropriate for the band being imaged. The band data buffer presents data to high voltage amplifiers, circuit 1009, which in turn drive PLZT chips #1 (1010) and #2 (1011). The light passing through these chips is intercepted by photodiode feedback pc board, indicated in FIG. 10 as 1012, and in FIG. 3 as board 304. The analog data produced by this board operates in a feedback loop with the high voltage amplifiers (1009) so as to compensate for various errors which might be present. These errors include, but are not limited to, variations in temperature of the PLZT chips, variations in brightness of the lamp, variations in the gain of the high voltage amplifiers, nonlinearities in the plzt chips, and other variables.

Those skilled in the art will recognize that variations from the preferred embodiments described herein are possible. For example, reds green, and blue light emitting diodes could be used as light sources instead of the PLZT chips. In this case, the filter wheel would be eliminated. Nonetheless, an aperture wheel would be used to shape the beam energies.

Various details, such as whether the imaging is done in color or black and white, how many PLZT chips are used, how many pixels per chip are used, and what resolutions are used, are variable within the confines of this invention as defined by the following claims:

I claim:

1. An apparatus for creating an image on a photosensitive material, comprising:
    (a) a drum, the drum having a longitudinal axis and a surface for accepting the photosensitive material;
    (b) a first motor, the motor being cooperatively attached to the drum so as to cause the drum to rotate about the longitudinal axis;
    (c) a light source, the light source emitting light along an optical path, the emitted light impinging the photosensitive material;
    (d) an apertured disc, interposed in the optical path between the light source and the photosensitive media, the apertured disc being perforated by a plurality of radially spaced orifices arranged into a first aperture array and a second aperture array;
    (e) a second motor, the second motor being cooperatively attached to the apertured disc so as to cause the apertured disc to rotate between a first position and a second position, wherein in the first position all of the orifices in the first aperture array are positioned within the optical path between the light source and the photosensitive media, and in the second position all of the orifices in the second aperture array are positioned within the optical path between the light source and the photosensitive media; and
    (f) control means for causing the emitted light to impinge the photosensitive material selectively through the first aperture array and the second aperture array by synchronizing movement of the apertured disc and the drum, thereby providing an image on the photosensitive material.

2. The apparatus of claim 1, further comprising a first lens, arranged within the optical path between the light source and the apertured disc, for collimating the emitted light.

3. An apparatus for creating an image on a photosensitive material, comprising:
    (a) a drum, the drum having a longitudinal axis and a surface for accepting the photosensitive material;
    (b) a first motor, the motor being cooperatively attached to the drum so as to cause the drum to rotate about the longitudinal axis;
    (c) a light source, the light source emitting light along an optical path, the emitted light impinging the photosensitive material;
    (d) an apertured disc, interposed in the optical path between the light source and the photosensitive media, the apertured disc being perforated by a plurality of radially spaced orifices;
    (e) a second motor, the second motor being cooperatively attached to the apertured disc so as to cause the apertured disc to rotate;
    (f) control means for causing the emitted light to impinge the photosensitive material through a selected number of the plurality of radially spaced orifices by synchronizing movement of the apertured disc and the drum, thereby providing an image on the photosensitive material;
    (g) a first lens, arranged within the optical path between the light source and the apertured disc, for collimating the emitted light;
    (h) a first polarizer, arranged within the optical path between the first lens and the apertured disc, for polarizing the emitted light prior to passing through the apertured disc; and
    (i) at least one electro optic linear array, arranged within the optical path between the first polarizer and the apertured disc, for variably rotating the polarization of the emitted light passing through the array.

4. The apparatus of claim 3, further comprising a second polarizer arranged within the optical path between the electro optic linear array and the apertured disc.

5. The apparatus of claim 4, further comprising a filter wheel, rotatably mounted adjacent to the apertured disc and interposed in the optical path between the second polarizer and the apertured disc, for selectively controlling a color of the emitted light, the filter wheel including at least one colored filter.

6. The apparatus of claim 5, further comprising a third motor, cooperatively attached to the filter wheel, for selectively rotating the filter wheel.

7. The apparatus of claim 6, further comprising a second electro optic linear array arranged coplanar with the first electro optic linear array within the optical path between the first polarizer and the apertured disc, wherein the first electro optic linear array and the second electro optic linear array each produce a set of approximately thirty-two coplanar linear light beams, thereby creating a first set of coplanar linear light beams and a second set of coplanar linear light beams.

8. The apparatus of claim 7, wherein the radially spaced orifices perforating the apertured disc are arranged in a pair of adjacent, parallel, coplanar lines, wherein the pair of adjacent, parallel, coplanar lines are spaced apart from one another by a distance substantially equal to a distance separating the first set of the coplanar linear light beams from the second set of coplanar linear light beams, thereby forming an aperture array.

9. The apparatus of claim 8, further comprising an objective lens arranged within the optical path between the apertured disc and the drum.

10. The apparatus of claim 7, wherein the radially spaced orifices perforating the apertured disc are arranged in a first pair of adjacent, parallel, coplanar lines forming a first aperture array, and in a second pair of adjacent, parallel, coplanar lines forming a second aperture array, and wherein the orifices in the first aperture array are sized and spaced to allow imaging at a first imaging resolution, and the orifices in the second aperture array are sized and spaced to allow imaging at a second imaging resolution.

11. An imaging apparatus for recording an image on a photoreceptor, comprising:
 (a) light-producing means for providing a plurality of light beams arranged in a regular pattern;
 (b) an optical system for conveying the plurality of light beams along an optical path from the light-producing means to the photoreceptor;
 (c) an apertured member, arranged in the optical path between the light-producing means and the photoreceptor, wherein the apertured member includes a first plurality of apertures and a second plurality of apertures defined thereon; and
 (d) moving means for moving the apertured member between a first position and a second position relative to the plurality of light beams, wherein in the first position, the first plurality of apertures are interposed in the optical path to convey the plurality of light beams to the photoreceptor, and in the second position, the second plurality of apertures are interposed in the optical path to convey the plurality of light beams to the photoreceptor.

12. The imaging apparatus of claim 11, further comprising:
 (a) a drum for supporting the photoreceptor, the drum having a longitudinal axis;
 (b) means for rotating the drum about the longitudinal axis; and
 (c) means for moving at least a portion of the optical system in a direction substantially parallel to the longitudinal axis of the drum.

13. The imaging apparatus of further comprising deflecting means for selectively deflecting the plurality of light beams between a first orientation and a second orientation, wherein the first orientation of the plurality of light beams and the second orientation of the plurality of light beams are interlaced.

14. The imaging apparatus of claim 13, wherein the deflecting means comprises a rotatable glass plate and means, coupled to the glass plate, for rotating the glass plate between a first angular orientation during a first imaging pass of the photoreceptor and a second angular orientation during a second imaging pass of the photoreceptor.

15. The imaging apparatus of claim 14, further comprising means for rotating the glass plate to correct for positional errors.

16. The imaging apparatus of claim 11, wherein the plurality of light beams comprise a first substantially linear array of light beams projecting in a first plane and a second substantially linear array of light beams projecting in a second plane, wherein the first plane and the second plane are substantially parallel, and wherein the first plurality of apertures are arranged in a first substantially linear array oriented along a first axis and a second substantially linear array oriented along a second axis, wherein the first axis and the second axis are substantially parallel.

17. The imaging apparatus of claim 11, wherein the apertures in the apertured member each include a center region oriented between a first side region and a second side region, wherein adjacent pixels are imaged on the photoreceptor through two apertures and light projected through the first side region of one of said apertures overlaps light projected through the second side region of another of said apertures to define an overlapping region, and further wherein the combined heights of the first side region and the second side region of the apertures at any point throughout the overlapping region are substantially equal to a height of the center region of each of the apertures to provide substantially uniform exposure across adjacent pixels and the overlapping regions therebetween.

18. The imaging apparatus of claim 17, wherein the first plurality of apertures and the second plurality of apertures are generally hexagonally-shaped.

19. The imaging apparatus of claim 11, further comprising a filter wheel, arranged in the optical path, for selectively controlling a color of the plurality of light beams.

20. The imaging apparatus of claim 11, further comprising intensity control means for controlling the intensity of the plurality of light beams, wherein the intensity control means includes:
 (a) a beam splitter, disposed in the optical path, for diverting a portion of each light beam in the plurality of light beams;
 (b) a light detector arranged to receive the diverted portion of each light beam;
 (c) means, coupled to the light detector, for providing light flux measurements representative of the light flux of each light beam; and
 (d) means, coupled to the means for providing light flux measurements and the light producing means, for regulating the light flux of each light beam in response to the light flux measurements.

21. The imaging apparatus of claim 11, wherein the second plurality of apertures are smaller than and spaced closer together than the first plurality of apertures; whereby the photoreceptor is imaged at a higher imaging resolution when the apertured member is in the second position than when the apertured member is in the second position.

22. The imaging apparatus of claim 11, wherein at least a portion of the plurality of light beams are disposed in a linear array and wherein individual apertures in the first plurality of apertures are offset transversely from a linear axis for compensating for optical errors in the portion of the plurality of light beams.

23. An imaging apparatus for recording an image on a photoreceptor, comprising:
 (a) light-producing means for providing a plurality of light beams arranged in a regular pattern;
 (b) an optical system for conveying the plurality of light beams along an optical path from the light-producing means to the photoreceptor;
 (c) an apertured member, arranged in the optical path between the light-producing means and the photoreceptor, the apertured member including a first plurality of apertures and a second plurality of apertures defined thereon, wherein the second plurality of apertures are offset from the first plurality of apertures;

(d) moving means for moving the apertured member between a first position and a second position relative to the plurality of light beams, wherein in the first position, the first plurality of apertures are interposed in the optical path to convey the plurality of light beams to the photoreceptor, and in the second position, the second plurality of apertures are interposed in the optical path to convey the plurality of light beams to the photoreceptor; and (e) deflecting means for selectively deflecting the plurality of light beams between a first orientation and a second orientation, wherein the first orientation of the plurality of light beams and the second orientation of the plurality of light beams are interlaced, the deflecting means including means for actuating the moving means to move the apertured member between the first position during a first imaging pass of the photoreceptor and the second position during a second imaging pass of the photoreceptor.

24. An imaging apparatus for recording an image on a photoreceptor, comprising:

(a) light-producing means for providing a plurality of light beams arranged in a regular pattern;

(b) an optical system for conveying the plurality of light beams along an optical path from the light-producing means to the photoreceptor;

(c) an apertured member, arranged in the optical path between the light-producing means and the photoreceptor, the apertured member including a first plurality of apertures and a second plurality of apertures defined thereon, wherein the apertured member comprises a rotatable apertured disc interposed in the optical path, and wherein the first plurality of apertures are disposed at a first angular orientation and the second plurality of apertures are disposed at a second angular orientation; and (d) means for rotating the apertured member between a first angular position end a second angular position, wherein in the first angular position, the first plurality of apertures are interposed in the optical path to convey the plurality of light beams to the photoreceptor, and in the second angular position, the second plurality of apertures are interposed in the optical path to convey the plurality of light beams to the photoreceptor.

25. An imaging apparatus for bandwise recording an image on a photoreceptor, comprising:

(a) imaging means for imaging a plurality of light beams on the photoreceptor along an optical path, wherein the plurality of light beams are arranged along an imaging axis with a fixed spacing between adjacent light beams along the imaging axis, the plurality of light beams for imaging pixels on the photoreceptor;

(b) means for fixing the imaging means in a fixed position with respect to the imaging axis when the plurality of light beams are imaged onto the photoreceptor; and (c) deflecting means, disposed in the optical path between the imaging means and the photoreceptor, for selectively deflecting the plurality of light beams between a first orientation along the imaging axis during a first imaging pass of the photoreceptor and a second orientation along the imaging axis during a second imaging pass of the photoreceptor, thereby interlacing pixels imaged on the photoreceptor by the plurality of light beams deflected in the second orientation with the pixels imaged on the photoreceptor by the plurality of light beams deflected in the first orientation, and wherein the deflecting means deflects the plurality of light beams between the first orientation and the second orientation a distance along the imaging axis which is half of the fixed spacing of the plurality of light beams along the imaging axis.

26. The imaging apparatus of claim 25, wherein the deflecting means comprises a rotatable glass plate and means for rotating the glass plate between a first angular orientation and a second angular orientation.

27. The imaging apparatus of claim 26, further comprising means for rotating the glass plate to correct for positional errors.

28. An imaging apparatus for bandwise recording an image on a photoreceptor, comprising:

(a) imaging means for imaging a plurality of beams on the photoreceptor along an optical path, wherein the plurality of light beams are arranged along an imaging axis, the plurality of light beams for imaging pixels on the photoreceptor;

(b) means for fixing the imaging means in a fixed position with respect to the imaging is when the plurality of light beams are imaged onto the photoreceptor; and (c) deflecting means, disposed in the optical path between the imaging means and the photoreceptor, for selectively deflecting the plurality of light beams between a first orientation along the imaging axis during a first imaging pass of the photoreceptor and a second orientation along the imaging axis during a second imaging pass of the photoreceptor, thereby interlacing pixels imaged on the photoreceptor by the plurality of light beams deflected in the second orientation with the pixels imaged on the photoreceptor by the plurality of light beams deflected in the first orientation, wherein the deflecting means comprises:

(1) an apertured member including a first plurality of apertures and a second plurality of apertures, the second plurality of apertures being offset from the first plurality of apertures; and (2) moving means for moving the apertured member between a first position and a second position relative to the plurality of light beams, wherein in the first position, the first plurality of apertures are interposed in the optical path to convey the plurality of light beams to the photoreceptor, and in the second position, the second plurality of apertures are interposed in the optical path to convey the plurality of light beams to the photoreceptor.

* * * * *